(12) United States Patent
Walker et al.

(10) Patent No.: US 7,086,947 B2
(45) Date of Patent: Aug. 8, 2006

(54) SYSTEMS AND METHODS FOR FACILITATING PLAY OF A CASINO GAME VIA EXPIRING PREPAID PLAYS OF THE CASINO GAME

(75) Inventors: Jay S. Walker, Ridgefield, CT (US); James A. Jorasch, Stamford, CT (US); Andrew S. Van Luchene, New York, NY (US); Geoffrey M. Gelman, Stamford, CT (US); Magdalena M. Fincham, Norwalk, CT (US)

(73) Assignee: Walker Digital, LLC, Stamford, CT (US)

(*) Notice: Subject to any disclaimer, the term of this patent is extended or adjusted under 35 U.S.C. 154(b) by 678 days.

(21) Appl. No.: 10/213,464

(22) Filed: Aug. 5, 2002

(65) Prior Publication Data

US 2003/0003983 A1 Jan. 2, 2003

Related U.S. Application Data

(63) Continuation-in-part of application No. 09/805,401, filed on Mar. 13, 2001, now Pat. No. 6,558,255, which is a continuation of application No. 08/886,584, filed on Jul. 1, 1997, now Pat. No. 6,227,972.

(51) Int. Cl.
 *A63F 13/00* (2006.01)
(52) U.S. Cl. .............................. 463/25; 463/16; 463/29
(58) Field of Classification Search ................. 463/16, 463/25, 29
 See application file for complete search history.

(56) References Cited

U.S. PATENT DOCUMENTS

| 4,467,424 A | 8/1984 | Hedges et al. .............. 364/412 |
|---|---|---|
| 4,636,951 A | 1/1987 | Harlick ........................ 364/412 |
| 4,764,666 A | 8/1988 | Bergeron ..................... 235/380 |
| 4,880,237 A | 11/1989 | Kishishita ............... 273/138 A |
| 4,900,903 A * | 2/1990 | Wright et al. ................ 235/380 |
| 5,038,022 A | 8/1991 | Lucero ......................... 235/380 |
| 5,056,019 A | 10/1991 | Schultz et al. .............. 364/405 |
| 5,179,517 A | 1/1993 | Sarbin et al. ................ 364/410 |
| 5,231,568 A | 7/1993 | Cohen et al. ................ 364/401 |
| 5,265,874 A | 11/1993 | Dickinson et al. ...... 273/138 A |
| 5,277,424 A | 1/1994 | Wilms ..................... 273/85 CP |
| 5,321,241 A | 6/1994 | Craine ......................... 235/380 |
| 5,353,335 A | 10/1994 | D'Urso et al. ................ 379/67 |
| 5,370,306 A | 12/1994 | Schulze et al. ......... 273/138 A |
| 5,373,440 A | 12/1994 | Cohen et al. ................ 364/410 |
| 5,397,883 A | 3/1995 | Miyashita .................... 235/382 |

(Continued)

OTHER PUBLICATIONS

Laub, Karen, "Taking a Ride on the 'Gamblers Express' to Atlantic City", The Associated Press, Jul. 31, 1984, Section: Domestic News.

(Continued)

*Primary Examiner*—John M. Hotaling, II
*Assistant Examiner*—Milap Shah
(74) *Attorney, Agent, or Firm*—Magdalena M. Fincham

(57) ABSTRACT

In accordance with at least one embodiment, an expiring prepaid casino account is disclosed. The expiring prepaid casino account has associated therewith an amount of money, time, and/or game plays. The amount of money, time, and/or game plays expires in predetermined portions over a plurality of defined expiration periods, thus encouraging a player to return to a casino during each of the predefined expiration periods. The present invention may be implemented via either a brick-and-mortar casino or an online casino.

30 Claims, 11 Drawing Sheets

U.S. PATENT DOCUMENTS

| | | | |
|---|---|---|---|
| 5,401,024 A | 3/1995 | Simunek | 273/138 A |
| 5,429,361 A | 7/1995 | Raven et al. | 273/138 A |
| 5,533,727 A | 7/1996 | DeMar | 463/23 |
| 5,551,692 A | 9/1996 | Pettit et al. | 273/143 R |
| 5,559,312 A | 9/1996 | Lucero | 235/380 |
| 5,570,885 A | 11/1996 | Ornstein | 463/27 |
| 5,655,961 A | 8/1997 | Acres et al. | 463/27 |
| 5,741,183 A | 4/1998 | Acres et al. | 463/42 |
| 5,758,875 A | 6/1998 | Giacalone, Jr. | 273/143 R |
| 5,770,533 A | 6/1998 | Franchi | 463/42 |
| 5,772,509 A | 6/1998 | Weiss | 463/16 |
| 5,816,917 A | 10/1998 | Kelmer et al. | 463/16 |
| 5,816,918 A * | 10/1998 | Kelly et al. | 463/16 |
| 5,830,067 A | 11/1998 | Graves et al. | 463/40 |
| 5,876,284 A | 3/1999 | Acres et al. | 463/25 |
| 6,012,983 A | 1/2000 | Walker et al. | 463/20 |
| 6,227,972 B1 | 5/2001 | Walker et al. | 463/25 |
| 6,244,957 B1 | 6/2001 | Walker et al. | 463/20 |

OTHER PUBLICATIONS

Mattiace, Peter, The Associated Press, Mar. 28, 1989, Section: Domestic News.

Ritchie, Lauren, "Orange Man Sought In Betting Probe", Orlando Sentinel Tribune, May 30, 1990, Section: Local & State, p. B2.

Mayo, Michael, "Win-Or-Lose-Cruise, You Can Bet Sports Legally Around Here—Just Wait Till The Boat Is 3 Miles Out.", Sun-Sentinel, Dec. 28, 1994, p. 1C.

"Bellsouth Issues Telecards Commemorating Summit", Telecommunications Alert, Jan. 5, 1995, Section: No. 3, vol. 12, ISSN: 0742-5384.

Andrews, Mea, "Casinos drop deal", Business Dateline; Missoulian, Feb. 11, 1995, Section: Section B, p. 1.

Sanford, L. Maxine, "Cash in on Calling Cards", Home Office Computing, Jun. 1995.

Norton, Dana, "They've got your number; Prepaid calling cards convenient but not always cheap", The Boston Herald, Oct. 29, 1995, Section: Lifestyle, p. 054.

"Card Briefs: Stored-Value Card Designed for Casinos", The American Banker, Oct. 31, 1995, Section: Credit/Debit/ATMs, p. 23.

"Bet On It: The smart card is rolling into the international gaming industry.", CardFAX, Feb. 19, 1996.

Curry, Angela, "How to navigate through a world of prepaid phone cards", The Kansas City Star, Mar. 25, 1996, Section: FYI, p. D4, At Your Service.

Cave, Kathy, "The Lake Effect", Milwaukee Journal Sentinel, Mar. 27, 1996, p. 8.

Holley, David, "Perils and Profits of Pachinko Passion", Los Angeles Times, Oct. 24, 1996, Section: Part A, p. 1, Foreign Desk.

Website: "Bingo—Network Gaming International", (http__// network-bingo__com/bingo__htm), download date: Nov. 13, 1996.

O'Sullivan, Kathryn, "Plastic silences pokies", The Evening Post (Wellington), Dec. 10, 1996, Section: News, National, p. 16.

Kristof, Kathy M., "Investments, guides provide ongoing gifts", The Dallas Morning News, Dec. 23, 1996, Section: Business, p. 1D.

Grimes, Richard, "Player Cards at West Virginia Ractracks OK'D: Innovation Keeps Track of Winnings Like Frequent Flier Cards", Charleston Daily Mail, Mar. 28, 1997, Section: News, p. P6A.

"SmarTalk (SM) Usage Continues To Rise", PR Newswire, Apr. 4, 1997, Section: Financial News.

"AT&T, NBA team up for official PrePaid Card of the NBA; Twenty-nine card set to feature 21 current or former NBA All-Stars", Business Wire, Apr. 7, 1997.

"MCI—You Can Get Up To 6 Hours of Free Long Distance Calling.", American Express Card Statement Promotion, May 1997.

* cited by examiner

| DATE ACCOUNT OPENED 510 | ACCOUNT NUMBER 512 | PLAYER TRACKING ID NUMBER 514 | TOTAL CURRENT VALUE 516 | EXPIRING AMOUNT PER EXPIRATION PERIOD 518 | EXPIRATION PERIOD DURATION 520 | BALANCE REMAINING FOR CURRENT EXPIRATION PERIOD 522 | BALANCE RESET DATE 524 | RESTRICTION FIELD 526 | PLAY REQUIREMENTS TO ACCESS BALANCE 530 |
|---|---|---|---|---|---|---|---|---|---|
| 5/19/97 | 456789 | 321234 | $90 | $10 | 1 WEEK | 0 | 5/26/97 | MONDAY-THURSDAY | WAGER $50 |
| 5/20/97 | 456790 | 331567 | $45 | $5 | 1 DAY | $5 | 5/21/97 | NONE | PLAY 1 HOUR |
| 5/01/97 | 456791 | UNASSIGNED | $200 | $20 | 1 MONTH | $20 | 6/01/97 | 10AM-2PM | NONE |

| DATE ACCOUNT OPENED 560 | ACCOUNT NUMBER 562 | PLAYER TRACKING ID NUMBER 564 | TOTAL CURRENT VALUE 566 | BALANCE FOR EXPIRATION PERIOD 1 568 | EXPIRATION PERIOD 1 570 | BALANCE FOR EXPIRATION PERIOD 2 572 |
|---|---|---|---|---|---|---|
| 5/19/97 | 456789 | 321234 | $90 | $10 | 5/19/97- 5/26/97 | $10 |
| 5/20/97 | 456790 | 331567 | $45 | $10 | 5/01/97- 5/31/97 | $12 |
| 5/01/97 | 456791 | UNASSIGNED | $200 | $10 | 5/19/97- 5/19/97 | $25 |

552 554 556

| EXPIRATION PERIOD 2 574 | ... | BALANCE FOR EXPIRATION PERIOD N 580 | EXPIRATION PERIOD N 584 | RESTRICTION FIELD 586 | REQUIREMENTS TO ACCESS BALANCE 590 |
|---|---|---|---|---|---|
| 5/27/97- 6/03/97 | | $10 | 6/04/97- 6/11/97 | MONDAY- THURSDAY | WAGER $50 |
| 6/01/97 6/30/97 | | $15 | 7/01/97- 7/31/97 | NONE | PLAY 1 HOUR |
| 5/20/97- 5/20/97 | | $10 | 5/21/97- 5/21/97 | 10AM-2PM | NONE |

SYSTEMS AND METHODS FOR FACILITATING PLAY OF A CASINO GAME VIA EXPIRING PREPAID PLAYS OF THE CASINO GAME

This application is a continuation-in-part application of, commonly-owned, U.S. patent application Ser. No. 09/805,401 filed Mar. 13, 2001 in the name of Walker et al. and entitled METHOD AND APPARATUS FOR EXPIRATION OF PREPAID SLOT MACHINE PLAYS, which issued on May 6, 2003 as U.S. Pat. No. 6,558,255; which is a continuation application of U.S. patent application Ser. No. 08/886,584 filed Jul. 1, 1997 in the name of Walker et al., entitled METHOD AND APPARATUS FOR EXPIRATION OF PREPAID SLOT MACHINE PLAYS, and which issued May 08, 2001 as U.S. Pat. No. 6,227,972 B1. The entirety of the above is incorporated by reference herein for all purposes.

BACKGROUND OF THE INVENTION

Casino games, including slot machine games, video poker games, video keno games or video blackjack games are an important source of income for the gambling industry. Accordingly, casinos (including brick-and-mortar and online casinos) constantly search for new gaming strategies and features to provide additional incentives for players to continue play and to distinguish play at their establishments from competitors in the industry.

For example, as an added incentive to play gaming devices and to increase customer loyalty, many brick-and-mortar casinos offer "slot club" programs to reward players. Each player in a slot club is generally issued a player tracking card encoded with his identification number. The casino awards "player reward points" for the player as he plays in that casino. The "player reward points" can generally be redeemed for merchandise or services at the casino hotel. In many cases, however, these incentives are not sufficient motivation for a player to return to a particular casino since many players join such slot club programs at multiple casinos and most slot club programs offer similar incentives.

Casinos have also attempted to attract or retain players by providing players with prepaid casino cards, wherein a monetary amount is associated with the card and the player that receives the card may use the monetary amount to gamble at the casino. Either a casino or a player may provide the funds associated with such a prepaid card. These prior art prepaid casino cards, however, have also not been sufficiently effective at encouraging players to make return trips to a casino or to attract new players to a particular casino. In the case where the player provides the funds associated with the prepaid casino card, the player may simply cash out any funds remaining on the card at the end of a gaming session and thus have no incentive to return to the casino. In cases where a casino provides the funds associated with a prepaid card, the casinos have attempted to solve this problem by not allowing the funds associated with the prepaid casino card to be cashed out, thus forcing the player to either gamble with the funds or lose the funds. However, the player may simply use up the funds associated with the card in a single gambling session and thus, again, have no incentive to return to a casino.

A need thus exists for a system that sufficiently motivates a player to visit a particular casino and to make return visits to the casino. A need further exists for a system that allows a casino some measure of control over the times at which a player is motivated to make return visits to a casino.

BRIEF DESCRIPTION OF THE DRAWINGS

FIG. 5A is an exemplary depiction of a table from the prepaid card database of FIG. 2, in accordance with one embodiment of the present invention;

FIG. 5B is an exemplary depiction of a table from an alternative embodiment of the prepaid card database of FIG. 2, in accordance with another embodiment of the present invention;

DETAILED DESCRIPTION

Figure 1:
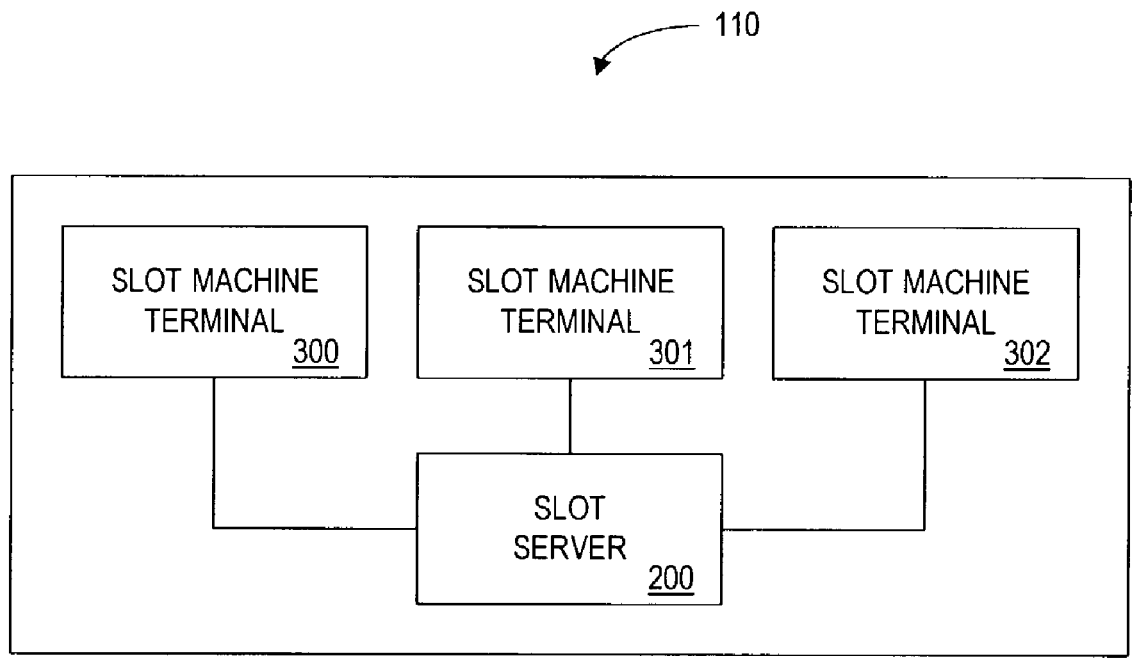
FIG. 1 is a schematic block diagram illustrating a suitable communications network for interconnecting one or more electronic gaming devices, such as slot machines, with a slot server, in accordance with one embodiment of the present invention.

Generally, according to one aspect of the invention, a player of a gaming device in a brick-and-mortar casino or a player of a game at an online casino can utilize an expiring prepaid casino account to provide payment for game play at the casino. The expiring prepaid casino account, or the identifier associated therewith, may function as a pointer to an amount of money, time, or game plays stored in a record of a database, wherein the amount of money, time, or game plays expires in predefined expiring amounts. Each of the predefined expiring amounts is associated with a respective expiration period.

An expiration period, as used herein, is a period of time with a defined start time and a defined end time during which the player may utilize the amount of money, time, or game plays associated with it. According to some embodiments, once the current time reaches the end time of the expiration period, any remaining balance of the amount of money, time, or game plays associated with the expiration period is no longer available to the player for any purpose. In other embodiments, once the current time reaches the end of the expiration period any remaining balance of the amount of money, time, or game plays associated with the expiration period may be available to the player, for example, (i) for limited purposes (e.g., for purchases of goods or services but not for gambling), (ii) if certain conditions are met (e.g., if the player is in the middle of a gambling session at the time), and/or (iii) if the player agrees to a specified forward commitment or to perform a task (e.g., to gamble for an extra half-hour or to answer survey questions).

As an example of an amount of money being associated with an expiring prepaid casino account, a total of $30.00 may be associated with an expiring prepaid casino account, wherein a $5.00 portion of the total $30.00 has a respective expiration period associated therewith. In such an example a player may use each of the $5.00 portions to place wagers on casino games during each of the six expiration periods. It should be noted that the amount may expire in any whole unit of money (e.g., cents, dollars, yen) or any fractional unit of money (e.g., ½ of a cent or ⅛ of a dollar).

As an example of an amount of time being associated with an expiring prepaid casino account, a total amount of 15 minutes may be associated with an expiring prepaid casino account, wherein a 5 minute portion of the total 15 minutes has a respective expiration period associated therewith. In such an example, a player may gamble without the necessity of providing payment for three 5 minute periods, as defined by the expiring prepaid casino account. It should be noted that the amount may expire in any whole unit of time (e.g., seconds, minutes, or hours) or any fractional unit of time (e.g., ½ of a second or ⅓ of a minute).

As an example of an amount of game plays being associated with an expiring prepaid casino account, a total of 100 game plays may be associated with an expiring prepaid casino account, wherein a 25 game play portion of the total 100 game plays has a respective expiration period associated therewith. In such an example, a player may play for 25 game plays (e.g., 25 handle pulls of a slot machine) during each of the respective expiration periods.

In accordance with some embodiments, an expiring prepaid casino account may specify which games the player may utilize the amount of money, time or game plays for. Further, it should be noted that the expiration periods associated with an amount of money, time, or game plays need not be consecutive or even close in time. For example, for an expiring prepaid casino account that has three expiration periods each associated with respective portions of an amount of money, time or game plays, the first expiration period may be July 1–July 7, the second expiration period may by October 2–October 4, and the third expiration period may be December 24–December 29. Further, expiration periods associated with a given expiring prepaid casino account may or may not be overlapping. Also, it should be noted that expiration periods may be of any duration and specificity. For example, an expiration period may be defined as (i) Day X of Month Y–Day Z of Month Y or (ii) Hour V, Minute W of Day X in Month Y–Hour V, Minute Z of Day X in Month Y.

In some embodiments, the amount associated with an expiring prepaid account may expire in very small amounts over very short expiration periods, wherein the beginning time of each expiration period is immediately after the end time of a previous expiration period and there are no gaps of time between expiration periods. In such embodiments the amount is essentially expiring continuously. For example, an amount of time associated with an expiring prepaid account may expire in one second portions, wherein one second of the amount of time expires for every one second that passes (or, e.g., for every two seconds that pass). In an example wherein the amount comprises an amount of money, the amount may expire such that $1 of the amount expires every minute.

In accordance with some embodiments the portion of an amount that expires for a given expiration period may be determined or adjusted based on activity during one or more previous expiration periods. Examples of activity that may affect the determination of the portion to expire may include the amount of wagers, time, or game plays the player spent gambling during one or more previous expiration periods and/or whether the player utilized a full amount associated with one or more previous expiration periods. The beginning or end time of a given expiration period may be similarly determined or adjusted based on activity during one or more previous expiration periods. In some embodiments the beginning time of an expiration period may be determined based on a time that a player begins gambling activity or another predetermined activity, rather than at a set time.

In some embodiments, the expiring prepaid casino account may be embodied as a smart card or a general-purpose debit card programmed with the predefined expiring amounts for each predefined expiration period, or a cardless electronic key or personal identification number (PIN) which may be utilized to access data records which have been programmed with the predefined expiring amounts for each predefined expiration period. In other embodiments the expiring prepaid casino account may be embodied as a cashless gaming ticket.

In online casino embodiments a player may not be provided with a casino card but may rather be provided with a casino player account identifier that uniquely identifies an account associated with the player. An amount of money, time, or game plays may thus be stored in association with the casino player account identifier rather than a casino card identifier. For purposes of brevity, the term expiring prepaid casino account is used herein to refer to any account or identifier, whether embodied as a casino card or otherwise, that has stored in association therewith an amount of money, time, or game plays that expire in expiring amounts, each expiring amount being associated with a respective expiration period.

According to a further feature of the present invention, the expiring prepaid casino account provides a casino with a number of flexible alternatives for providing players with fixed or variable expiring amounts over fixed or variable expiration periods, as desired, to suit various casino objectives and to permit the casino to implement numerous casino promotions. The expiring prepaid casino account may be, for example, (i) purchased by the player at face value, or at a discount; (ii) given out by the casino to a player for free as part of a promotion, or to preferred players; (iii) issued to a player as part of a payout (e.g., from a gaming device); and/or (iv) credited wholly or partially by funds provided by a player. It should be noted that as used herein the term "casino" refers to either or both a brick-and-mortar casino and an online casino. Accordingly, embodiments described herein apply to either or both a brick-and-mortar casino and an online casino.

In some embodiments, if a player does not utilize the entirety of a predefined expiring amount for a given predefined expiration period, the remaining balance of the expiring amount associated with the expiration period automatically expires (i.e., is not longer available for use to the player) and does not roll over into any subsequent expiration periods. In this manner, the player is incented to make return visits to a casino to access each predefined expiring amount for each predefined expiration period. In other embodiments, the player can be permitted a predefined number of excused absences over the expected life of the expiring prepaid casino card. For example, a player may obtain an expiring prepaid casino card which provides the player with predefined fixed expiring amounts for six individual months within a seven month period, thereby permitting an unused balance to carry over one month. An expiration period at the end of which the carrying over of any balance of the expiring amount of money, time, or game plays is allowed is referred to herein as a grace period.

According to some embodiments, the predefined expiring amounts or expiration periods do not have to be fixed units. A player can be issued an expiring prepaid casino account, for example, with a total value to be utilized in predefined variable monetary increments over predefined fixed or variable expiration periods. In various embodiments, the particular predefined variable expiring amounts which a player can access on the expiring prepaid casino account in a given expiration period can be (i) based on the time of day, week or month, in which the expiring amount is accessed, or (ii) randomly allocated among each of the several predefined expiration periods to obtain access to different expiring amounts for each expiration period. In addition, a player can have one or more predefined fixed expiring amounts increased by bonus amounts randomly awarded to one or more players from among the whole range of issued expiring prepaid casino accounts.

A casino can offer bonus expiring amounts to individual players based on past performance. In some embodiments a casino may offer a bonus expiring amount or increase an existing expiring amount based on activities performed by the player. For example, if the player refers other players to the casino or convinces other players to obtain expiring prepaid casino accounts the player may obtain a bonus expiring amount or an increase in an expiring amount associated with his expiring prepaid casino account. In some embodiments a bonus expiring amount or an offer for a bonus expiring amount may be provided to a player when the player indicates an intention to stop playing (e.g., the player actuates a cash out button on a gaming device or removes his slot card from a gaming device). For example, an offer to provide a player with a bonus expiring amount and an extension of an expiration period may be provided to a player once it is determined that a player has utilized the entirety of an expiring amount before the end of an expiration period and is attempting to cash out his credit balance from a gaming device.

The expiring prepaid casino account may be associated with one or more further restrictions or requirements that the player must satisfy before any expiring amounts can be accessed. For example, a player may be required to (i) wager a certain amount of money over a predetermined period of time (e.g., on a given slot machine), (ii) initiate a specified number of game plays (e.g., during a specified period of time), or (iii) play for a predefined period of time (e.g., continuously or accumulated over multiple play sessions), before a predefined expiring amount may be accessed. Likewise, a player can be denied access to available balances until one or more external events (i.e., events other than the passage of time, that are not solely in the control of either the player or the casino) are satisfied. Examples of external events include particular weather conditions, particular stock market conditions, or particular casino-utilization thresholds, for example, when fewer than thirty percent (30%) of the slot machines are being utilized in a brick-and-mortar casino or when fewer than a predetermined number of players are logged on to an online casino Web site.

In some embodiments the end of an expiration period associated with an amount may be based on the occurrence of an external event as well. For example, a monetary expiring amount may expire based on a game schedule of a particular team or sport. For example, in a sports betting embodiment, a monetary amount available for sports betting may expire if not used by the tenth game (based on a predetermined first game) played by a particular team or by the end of a season or portion of a season (e.g., quarter finals) of a sport.

In some embodiments, the expiring prepaid casino account may be associated with further restrictions requiring the player to wager or otherwise spend at the casino any predefined expiring amounts which were given out by a casino for free, or purchased by a player at a discount, and thereby prevent the player from cashing out such credits.

A more complete understanding of the present invention, as well as further features and advantages of the present invention, will be obtained by reference to the following detailed description and drawings.

FIG. 1 shows an illustrative network environment within a casino 110 for transferring information between one or more slot machines 300–302 and a slot server 200. It should be noted that although slot machines are illustrated in FIG. 1, any type of gaming device may be used. Further, in an online casino embodiment, the slot machines 300–302 may comprise user devices such as personal computers, personal digital assistants (PDAs), cellular telephones, pagers, or other computing devices capable of facilitating communication with an online casino. Also, in an online casino embodiment the slot server 200 may comprise or operate in cooperation with a Web server or other computing device hosting the online casino.

Figure 4A:
FIG. 4A shows a front view of an illustrative prepaid slot card, in accordance with one embodiment of the present invention.
Figure 4B:
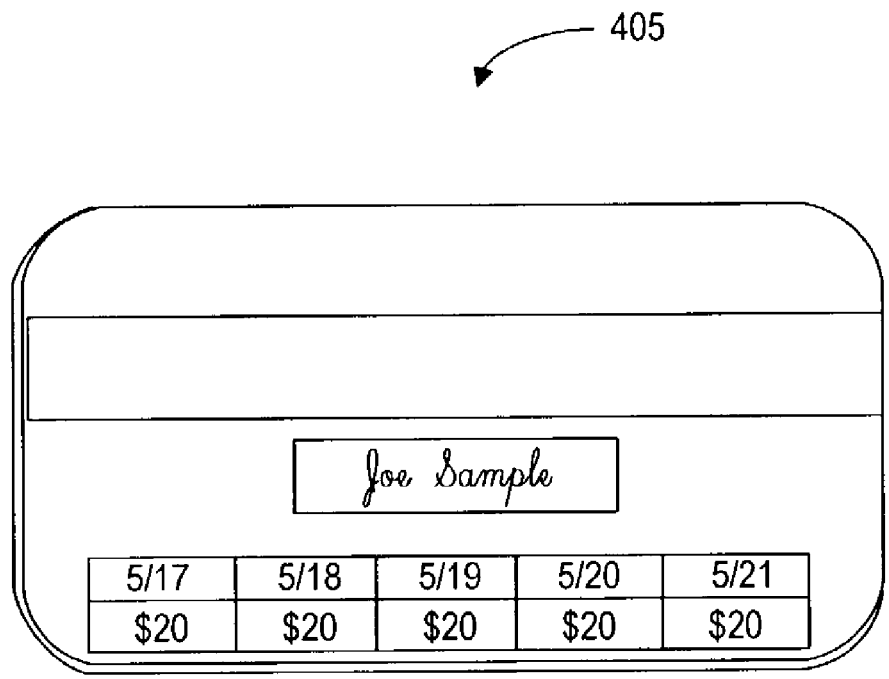
FIG. 4B shows a rear view of the illustrative prepaid slot card of FIG. 4A, in accordance with one embodiment of the present invention.

According to a feature of the present invention, a player of a gaming device, such as the slot machine 300, can utilize an expiring prepaid casino card 400, shown in FIGS. 4A and 4B, to provide payment for slot machine play or other gambling activities. The expiring prepaid casino card 400 may be a pointer to an amount of money, time, or game plays stored in an expiring prepaid account database 500, discussed below, that expires in predefined expiring amounts, each expiring amount being associated with a respective expiration period. In alternate implementations, the expiring prepaid casino card may be embodied as (i) a smart card or a general-purpose debit card programmed with the predefined expiring amounts, each expiring amount being associated with a respective predefined expiration period; (ii) a cardless electronic key or personal identification number (PIN) which may be utilized to access data records which have been programmed with the predefined expiring amounts for each predefined expiration period; and/or (iii) a cashless gaming ticket or a cashless gaming receipt. According to some embodiments, discussed herein, the expiring prepaid casino card 400 preferably provides a casino 110 with a number of flexible alternatives for providing players with fixed or variable expiring amounts of money, time, or game plays over fixed or variable expiration periods, as desired, to suit various casino objectives and to permit the casino 100 to implement numerous casino promotions.

For example, a player may obtain an expiring prepaid casino card 400 with a total value of $30.00, which provides the player with predefined fixed expiring amounts of $10.00 per day for each day of a three day vacation. It is noted that the expiring prepaid casino card 400 can preferably be (i)

purchased by the player at face value, or at a discount; (ii) given out by the casino 110 to a player for free as part of a promotion, or to preferred players; or (iii) issued to a player as part of a payout on a slot machine 300. In addition, a player can preferably recharge the expiring prepaid casino card 400 by inserting the card 400 into a slot machine 300, or a central card processing facility, and providing a form of payment, for example, by depositing one or more coins, or inserting a credit card, debit card or smart card, or utilizing stored credits awarded for slot machine play.

In one embodiment, if the player does not utilize the entire predefined expiring amount, for a given predefined expiration period, the remaining balance on the expiring prepaid casino card 400 allocated for the expiration period automatically expires and does not roll over into any subsequent expiration periods. In this manner, the player is incented to make return visits to a casino 110 to access each predefined expiring amount for each predefined expiration period. Alternatively, the player can be permitted a predefined number of excused absences over the expected life of the expiring prepaid casino card 400. For example, a player may obtain an expiring prepaid casino card 400 with a total value of $60.00, which provides the player with predefined fixed expiring amounts of $10.00 per month for six individual months within a seven month period, thereby permitting an unused balance to carry over one month.

According to one embodiment, neither the predefined expiring amounts of money, time, or game plays nor the expiration periods have to be fixed units. A player can be issued an expiring prepaid casino card 400, for example, with a total value of $100.00, to be utilized in predefined variable monetary increments over six monthly expiration periods. For example, the total value of an expiring prepaid casino card 400 can be distributed over each monthly expiration period such that the player can access $10.00 the first month, with incremental monthly increases over each subsequent month until the player can access $25.00 for the final sixth month.

In a variation of this embodiment, the predefined expiring amounts can be incremental, increasing in a predefined progression over the total expiration period, regardless of whether the player actually utilizes the expiring prepaid casino card 400 for each expiration period. Thus, if the predefined progression for a given expiring prepaid casino card 400 is $10.00, $15.00 and $25.00 for each month which the player utilizes the expiring prepaid casino card 400 within a three month period, and the player fails to access an expiring balance for the second month, then the expiring amount which the player can access in the third month is limited to $15.00. Thus, the player never reaches the maximum expiring amount of $25.00 which the player would have been entitled to had the player frequented the casino 110 for each of the three months. In this manner, the player is incented to frequent the casino consistently. In another embodiment, the particular variable expiring amounts which a player can access on the expiring prepaid casino card 400 in a given expiration period can be based on the time of day, week or month, in which the expiring amount was accessed. For example, the card 400 could provide a balance of $10.00 if accessed during predefined peak playing hours or $15.00 for off-peak hours. In an online casino embodiment, larger expiring amounts may be provided at times the player is more likely to be at a computer (e.g., during work hours, after dinner hours, etc.). Alternatively, larger expiring amounts may be provided at times the player is deemed to be less likely to be at a computer, in order to encourage the player to use the computer at these times. In such embodiments, a portion of the expiring amounts may be funded by entities likely to benefit from the player's presence at the computer (e.g., online retailers that advertise on the online casino's Web site).

In yet another variation of the variable expiring amount embodiment, variable expiring amounts can be randomly allocated to predefined expiration periods. For example, an expiring prepaid casino card 400 having an initial total value of $50.00 can be defined to provide a player with predefined expiring amounts of $10.00 for two days of a three-day vacation and $30.00 for a third day. The casino 110, however, can randomly select the particular day on which the expiring prepaid casino card 400 has a $30.00 value. In this manner, since the player is not sure which day of the three day expiration period will permit the player to access the $30.00 expiring amount, the player will frequent the casino to ensure that the player does not miss the day with the greater expiring amount on the expiring prepaid casino card 400. In addition, if the player has purchased the expiring prepaid casino card 400, the player may forfeit the remaining expiring amounts, once the greater value day has passed, thus leaving any remaining expiring amounts as breakage (profits) for the casino 110.

According to one embodiment, the randomness of the variable expiring amounts can occur over the whole range of issued expiring prepaid casino accounts, as opposed to an individual expiring prepaid casino account. In other words, each expiring prepaid casino account can be programmed to allocate predefined expiring amounts over each of a plurality of predefined expiration periods. In addition to the predefined expiring amount for a given expiration period, one or more expiring prepaid casino accounts can be randomly awarded bonus expiring amounts. The added excitement of an additional chance to win a bonus expiring amount may incent players to frequent the casino that is offering such an expiring prepaid casino account. Similarly, a casino can offer bonus expiring amounts to individual players based on performance. In other words, a player can be entitled to access a $10.00 per day expiring amount for each day of a five-day vacation. If, however, the casino determines that the player consistently utilized the card and was a high volume customer, or has otherwise complied with casino-defined criteria, the player could be awarded a higher expiring amount for each subsequent day.

In another embodiment, jackpots awarded based on casino game play funded by amounts accessed through an expiring prepaid casino account can be awarded in the form of an increased total balance on the expiring prepaid casino account that expires in predefined expiring amounts over predefined expiration periods. For example, if a player wins a $1,000.00 jackpot while playing the slot machine 300, the slot server 200 can offer the player an option to receive an enhanced jackpot amount of $1,200.00, which may be accessed by the player in predefined $200.00 expiring amounts over each of six predefined monthly expiration periods. In this manner, the jackpot is awarded through the expiring prepaid casino card 400, with no money leaving the casino 110, rather than as a cash payout.

The expiring prepaid casino account may be associated with one or more further restrictions or requirements that the player must meet before any expiring amounts can be accessed. For example, a player may be required to (i) play a certain amount of money (e.g., on a given slot machine 300 or other specified gaming device, within a predetermined period of time, and/or in a single gambling session); (ii) play a certain number of handle pulls or game plays (e.g., on a given gaming device, over a plurality of gambling sessions, or in a row); and/or (iii) play for a predefined period of time (e.g., at a specified or single gaming device or type of gaming device, continuously in a single gambling session or as accumulated over a plurality of gambling sessions), before any predefined expiring amounts may be accessed. For example, a player may be allowed access to a monetary amount (e.g., allowed to gamble with a monetary amount) if the current time falls within the expiration period associated with the monetary amount, and the player has either spent 90 minutes gambling today or wagered a total of at least $150 in the current day, whichever occurs first. Likewise, a player can be denied access to available balances until one or more external events are satisfied, including, for example, particular weather conditions, particular stock market conditions, or particular casino-utilization thresholds, for example, when fewer than thirty percent (30%) of the slot machines 300 are being utilized.

In embodiments wherein an expiring amount comprises an amount of money, the casino may require the player to wager any credits associated with a predefined expiring monetary amount. This may be done to prevent players from cashing out expiring amounts which were given out by a casino for free, or purchased by the player at a discount, and thereby prevent the defeat of the casino's motivation for issuing such discounted expiring prepaid casino accounts (e.g., to encourage players to continue playing after utilizing the predefined expiring amounts). In order to keep the predefined expiring amounts separate from conventional credits, the gaming device, a slot server, and/or an online casino may track the credits associated with a predefined expiring amount in an account, a balance, a credit meter, or database field which is separate from one in which the conventional credits are tracked. In this manner, individuals may be prevented from exploiting the system by cashing out credits from the card which were obtained for free or at a discount off the face value.

As used herein, the term "gaming device" refers to any programmable gaming terminal controlled by a random or pseudo-random event in which one or more players can wager on the outcome of the event, including traditional slot machines, video bingo, video keno, video poker and video blackjack devices. In addition, the term "gaming device" includes any device capable of issuing a tangible embodiment of a wager, such as chips, tokens, betting slips, betting tickets or bingo cards, in exchange for credits on a prepaid casino account. The slot server 200 and the slot machine 300, discussed further below in conjunction with FIGS. 2 and 3, respectively, may comprise conventional hardware and software, as modified herein to carry out the functions and operations described below. The slot server 200 and slot machine 300 transmit digitally encoded data and other information between one another. The transmitted data and other information may represent player name and identification number, play results, authenticated player identification, player requests to access an expiring amount from an expiring prepaid casino account, and any associated restrictions which the player must satisfy in order to access the expiring amount. The communications links between the slot server 200 and each slot machine, such as slot machine 300, may comprise, for example, cable or wireless links.

Figure 2:
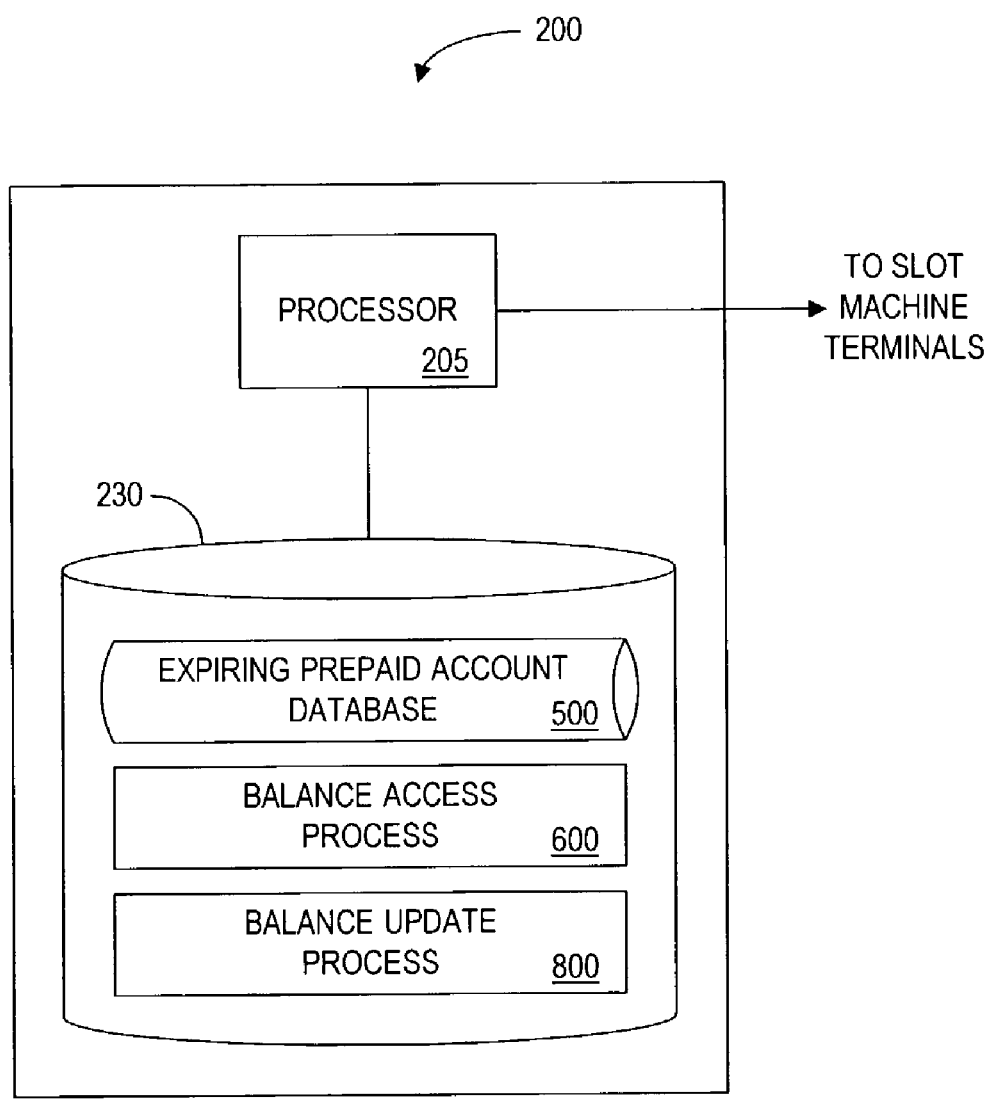
FIG. 2 is a schematic block diagram of the slot server of FIG. 1, in accordance with one embodiment of the present invention.

FIG. 2 is a block diagram showing the architecture of an illustrative slot server 200. The slot server 200 may be embodied, for example, as an RS 6000 server, manufactured by IBM™ Corp., as modified herein to execute the functions and operations of the present invention. The slot server 200 preferably includes a processor 205 and related memory, such as a data storage device 230. The processor 205 may be embodied as a single processor, or a number of processors operating in cooperation. The data storage device 230 and/or a read only memory (ROM) are operable to store one or more instructions, which the processor 205 is operable to retrieve, interpret and execute. The processor 205 preferably includes a control unit, an arithmetic logic unit (ALU), and a local memory storage device, such as, for example, an instruction cache or a plurality of registers, in a known manner. The control unit is operable to retrieve instructions from the data storage device 230 or ROM. The ALU is operable to perform a plurality of operations needed to carry out instructions. The local memory storage device is operable to provide high-speed storage used for storing temporary results and control information.

As discussed further below in conjunction with FIGS. 5A and 5B, the data storage device 230 may include an expiring prepaid account database 500. The expiring prepaid account database 500 comprises a plurality of records, each record defining an expiring prepaid account, including the total account balance and predefined expiring amounts for each expiration period. In addition, as discussed below in conjunction with FIGS. 6 and 8, respectively, the data storage device 230 may include a balance access process 600 and a balance update process 800. Generally, the balance access process 600 receives requests from a player to access a balance associated with an expiring prepaid casino account and releases a predefined expiring amount to a player, if available for the current expiration period, provided any associated restrictions have been met. The expiring balance update process 800 may cause any remaining expiring amount associated with an expiring prepaid casino account to automatically expire if not utilized within the predefined expiration period associated with the expiring amount.

Figure 3:
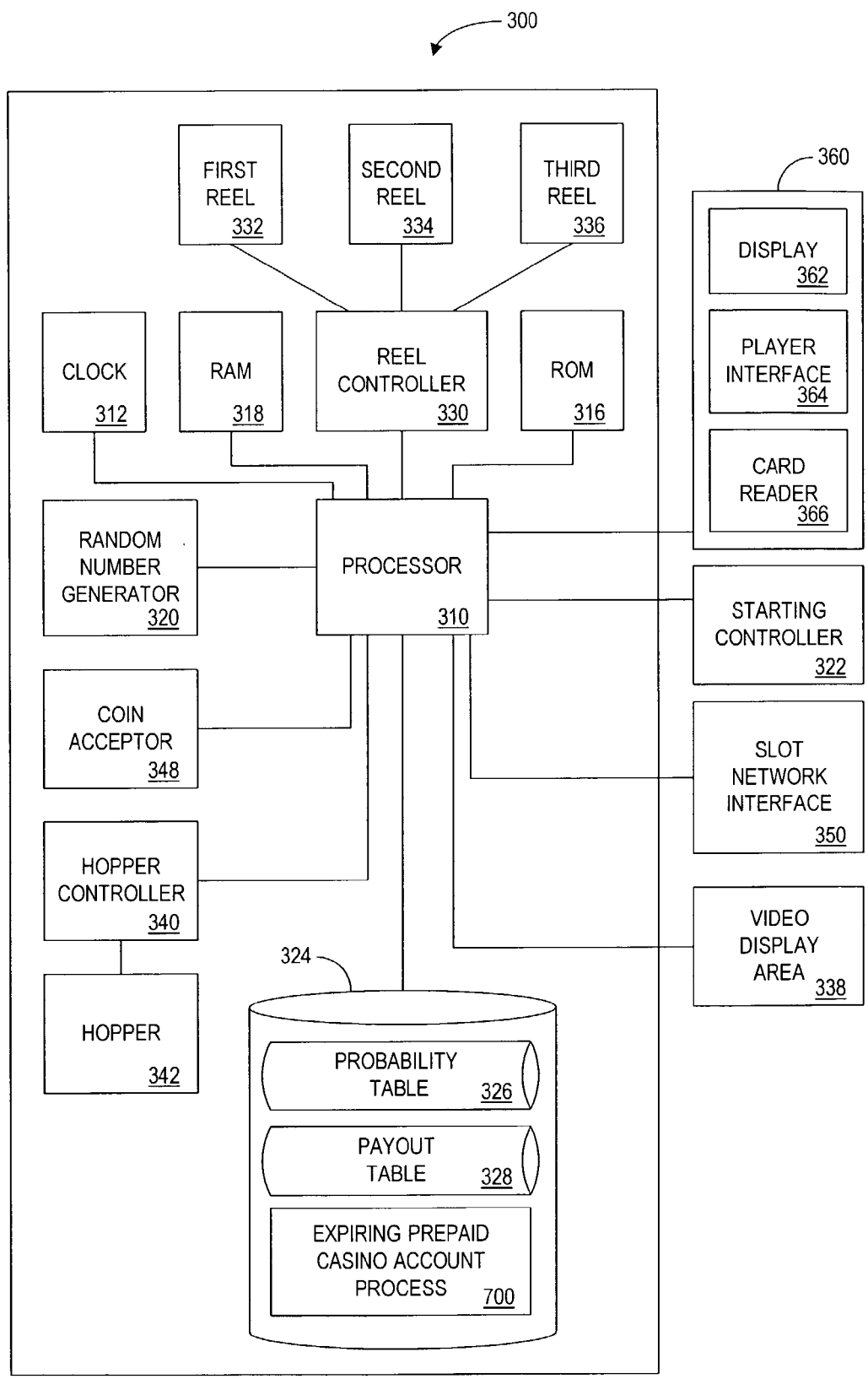
FIG. 3 is a schematic block diagram of an illustrative slot machine of FIG. 1, in accordance with one embodiment of the present invention.

FIG. 3 is a block diagram showing the architecture of an illustrative slot machine 300. The slot machine 300 may include certain standard hardware components, such as a processor 310, a data storage device 324, a ROM 316, a RAM 318, and a clock 312. The processor 310 may be in communication with each of the other listed elements, either by means of a shared data bus, or dedicated connections, as shown in FIG. 3. The processor 310 executes program modules stored in the data storage device 324 or the ROM 316 to perform the processes described below, in a known manner.

As shown in FIG. 3, the data storage device 324 includes a probability table 326 and a payout table 328. The probability table 326 stores the probability that each possible reel combination will result, in a conventional manner. The payout table 328 stores the payout associated with each winning reel combination, in a conventional manner, for a given number of coins wagered by a player. For a more detailed discussion of a suitable slot machine 300, and the associated probabilities and payouts, see J. Regan, Winning at Slot Machines (Citadel Press 1985), incorporated by reference herein.

In addition, as discussed further below in conjunction with FIG. 7, the data storage device 324 may include an expiring prepaid casino account process 700. Generally, the expiring prepaid casino account process 700 permits a player to utilize an expiring amount associated with an expiring prepaid casino account as a form of payment for game play at a casino, provided the player has satisfied any casino-defined requirements for accessing such expiring amounts. The process 700 is illustrated by reference to a brick-and-mortar casino embodiment, wherein an expiring prepaid casino card is inserted into a slot machine. It should be understood that a process substantially similar to that of process 700 may be used in an online casino embodiment, wherein a player provides an expiring prepaid casino account identifier when playing a game at the online casino.

Generally, a player playing a slot machine such as slot machine 300 starts the slot machine 300 in a conventional manner by providing a form of payment, for example, by depositing one or more coins by means of a coin acceptor 348, or inserting a credit card, debit card or smart card, and pressing a starting controller 322, such as a "spin reels" button. Thereafter, the processor 310 initiates the random number generator 320 to generate a number. The processor 310 looks up the generated random number in the appropriate probability table 326, and retrieves the corresponding reel combination, or game result. The processor 310 also directs a reel controller 330 to spin the reels 332, 334, 336 and to stop them at a point when a combination of symbols corresponding to the retrieved combination is displayed. Based on the identified slot outcome, and the number of coins wagered, the processor 310 locates the appropriate payout in the stored payout table 328. When a payout is awarded, the slot machine 300 stores the credits in the random access memory (RAM) 318 and displays the available credits to the player in a video display area 338. A hopper controller 340 is connected to a hopper 342 for dispensing coins. When the player requests to cash out by pushing a button on the slot machine 300, the processor 310 checks the RAM 318 to see if the player has any credit and, if so, signals the hopper 342 to release an appropriate number of coins into a payout tray (not shown).

A player tracking device 360 is also in communication with the processor 310. The player tracking device 360 comprises a card reader 366 for reading an expiring prepaid casino card 400 or player identification information stored on a player tracking card (not shown) or both. A player-tracking card may be encoded with information to identify the player, in a known manner. In one embodiment, an expiring prepaid casino card 400 can serve as both an expiring prepaid casino card and a player-tracking card. The player-tracking device 360 may also include a display 362 (e.g., a touch screen), and a player interface 364. The display 362 may be utilized to indicate any available balance associated with the expiring prepaid casino card 400. Suitable commercially available player card tracking devices include, for example, the Mastercom device available from Bally Manufacturing. (See, for example, U.S. Pat. No. 5,429,361 to Raven et al.). Such player tracking devices include a magnetic card reader and a numeric keypad for entry of player information.

The slot machine 300 also includes a slot network interface 350 that provides a communication path between the slot machine 300 and the slot server 200. Thus, as discussed further below, information may be communicated among the player tracking device 360, slot machine 300 and slot server 200.

In other embodiments, the slot machine 300 does not include the reel controller 330, or reels 332, 334, 336. Instead, the video display area 338 graphically displays representations of objects contained in the selected game, such as graphical reels or playing cards. These representations are preferably animated to display playing of the selected game.

A front view of an illustrative expiring prepaid casino card 400 is shown in FIG. 4A and a rear view 405 of the illustrative expiring prepaid casino card 400 is shown in FIG. 4B. In one embodiment, the front of an expiring prepaid casino card 400 may indicate the total value associated with the card 400, as well as the expiring amount and the expiration period. In addition, the rear view 405 of the expiring prepaid casino card 400 may include a field for the signature of the associated player, for security purposes, and a mechanism for allowing a player or the casino 110 to optionally check off each expiring amount as it is utilized for each expiration period.

As previously indicated, the expiring prepaid account database 500, shown in FIG. 5A, may store account information for a plurality of expiring prepaid casino accounts, including the total account balance and predefined expiring amounts for each expiration period. The database 500 shown in FIG. 5A accommodates expiring prepaid casino accounts having fixed predefined expiring amounts which expire over each of a plurality of fixed predefined expiration periods.

As shown in FIG. 5A, the expiring prepaid account database 500 maintains a plurality of records, such as records 502–506, each associated with a different expiring prepaid casino account. For each expiring prepaid casino account identified by an account number in field 512, the database 500 includes the date on which the account was opened in field 510, and the corresponding player tracking identification number, if different, assigned to the player in field 514. In addition, the database 500 may indicate the current balance, expiring amount per expiration period, expiration period duration, balance remaining for current expiration period and balance reset date, in fields 516 through 524, respectively. In addition, any restrictions and play requirements that the player must satisfy before being permitted to access an expiring amount are set forth in fields 526 and 530.

In an alternate embodiment, the expiring prepaid account database can be embodied as shown in FIG. 5B, to permit variable predefined expiring amounts which expire over each of a plurality of variable predefined expiration periods. Thus, the alternative expiring prepaid account database 550, shown in FIG. 5B, may store account information for a plurality of expiring prepaid casino accounts. For each expiring prepaid casino account identified by an account number in field 562, the database 550 includes the date on which the account was opened in field 560, and the corresponding player tracking identification number, if any, assigned to the player in field 564. In addition, the alternative expiring prepaid account database 550 may indicate the total current balance in field 566. Thereafter, the database 550 may includes a pair of fields for each available expiration period, with each pair of fields containing the balance for each expiration period, and the date range of the expiration period, such as fields 568 and 570 for the first expiration period, fields 572 and 574 for the second expiration period and fields 580 and 584 for the $n^{th}$ expiration period. In addition, any restrictions and play requirements which the player must satisfy before being permitted to access an expiring amount are set forth in fields 586 and 590, respectively. In this manner, the alternative expiring prepaid account database 550 provides greater flexibility to permit variability for both the expiring amounts and the expiration periods.

It should be noted that, in some embodiments, more than one expiration period may be associated with a single expiring amount for a given expiring prepaid casino account. It should further be noted that, in some embodiments, more than one expiring amount may be associated with a single expiration period for a given expiring prepaid casino account.

Some exemplary processes that may be performed by the slot server 200, or another computing device operating in accordance with the present invention, will now be described. It should be noted that, for illustrative purposes only, the processes are described with reference to a brick-and-mortar embodiment wherein a player utilizes an expiring prepaid casino card to identify an expiring prepaid casino account to a gaming device such as a slot machine. In other embodiments (e.g., online casino embodiments) substantially the same processes may be performed (e.g., by utilizing an identifier communicated to a computing device to identify an expiring prepaid casino account). Further, also for illustrative purposes only, the amount utilized in the following processes is an amount of money. Substantially similar processes may be performed if the amount is an amount of time or game plays. It should also be noted that although the following processes and/or specific steps of the following processes are described as being performed by a particular device (e.g., a slot machine), this is for illustrative purposes only and is not meant to be limiting. Any and all of the following process and individual steps in the following processes may be performed by any device (e.g., a computing device such as a server hosting an online casino) that is operable to perform the step in question.

Figure 6A:
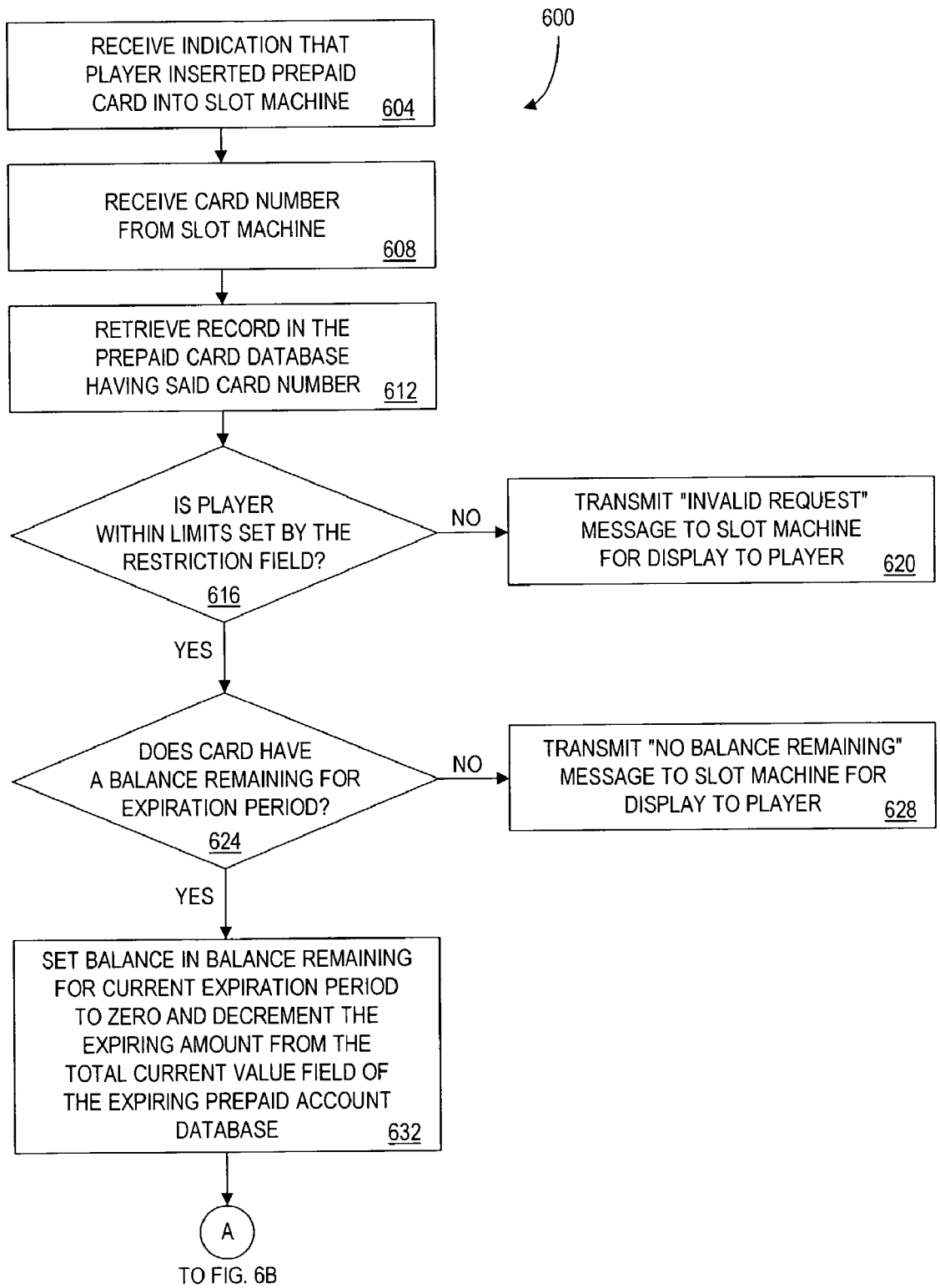
FIGS. 6A and 6B are a flow chart describing an exemplary balance access process as implemented by the slot server of FIG. 2, in accordance with one embodiment of the present invention.
Figure 6B:
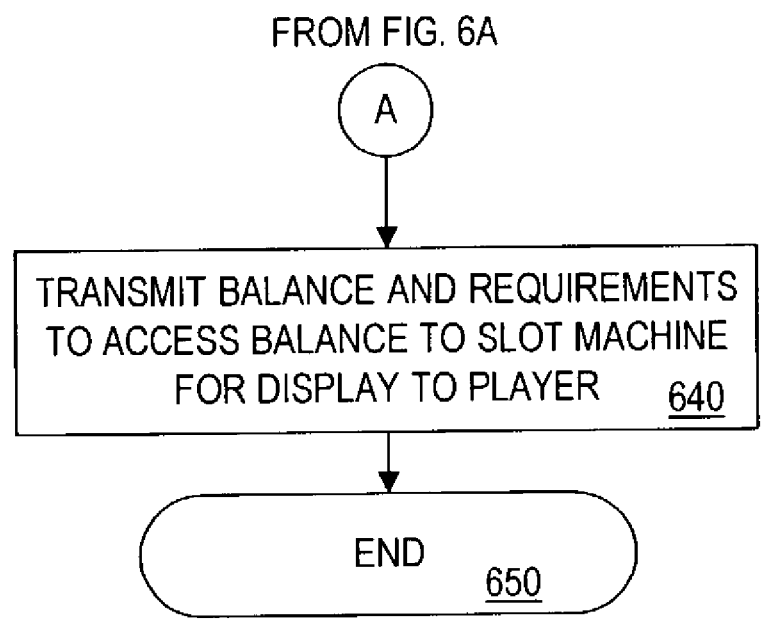

As previously indicated, the slot server 200 or another computing device operating in accordance with the present invention, may execute a balance access process 600, shown in FIGS. 6A and 6B, to receive requests from a player to access a balance associated with an expiring prepaid casino account and to release a predefined expiring amount to a player, if available for the current expiration period, provided any associated restrictions have been met. Thus, the balance access process 600 may be initiated during step 604 upon receipt of an indication from a slot machine 300 that a player has inserted an expiring prepaid casino card 400 into the slot machine 300. Thereafter, the slot server 200 may receive an indication of the card number from the slot machine 300 during step 608.

The card number received during the previous step is then utilized to retrieve the corresponding record in the expiring prepaid account database 500 during step 612. A test is then performed during step 616 to determine if the player is within the limits set by the restrictions field 526 of the expiring prepaid account database 500. If it is determined during step 616 that the player is not within the limits set by the restrictions field 526 of the expiring prepaid account database 500, then an "invalid request" message is transmitted to the slot machine 300 during step 620 for display to the player. If, however, it is determined during step 616 that the player is within the limits set by the restrictions field 526 of the expiring prepaid account database 500, then the balance in the balance remaining for current expiration period field 522 is set to zero during step 632 and the expiring amount is decremented from the total current value field 516 of the expiring prepaid account database 500. It is noted that for an implementation utilizing the alternative expiring prepaid account database 550, the balance in the appropriate balance remaining for expiration period n field, such as fields 568, 572, for the appropriate expiration period, is set to zero during step 632 and the expiring amount is decremented from the total current value field 566 of the alternative expiring prepaid account database 550.

Thereafter, the expiring amount balance and any play requirements to access the balance, as retrieved from field 530 or 590 of the expiring prepaid account database 500, 550, as appropriate, are transmitted to the slot machine 300 during step 640 (FIG. 6B), before program control terminates during step 650. In this manner, the functionality for ensuring compliance with any requirements to access the balance has been illustratively placed in the slot machine 300, as discussed further below in conjunction with FIG. 7.

Figure 7:
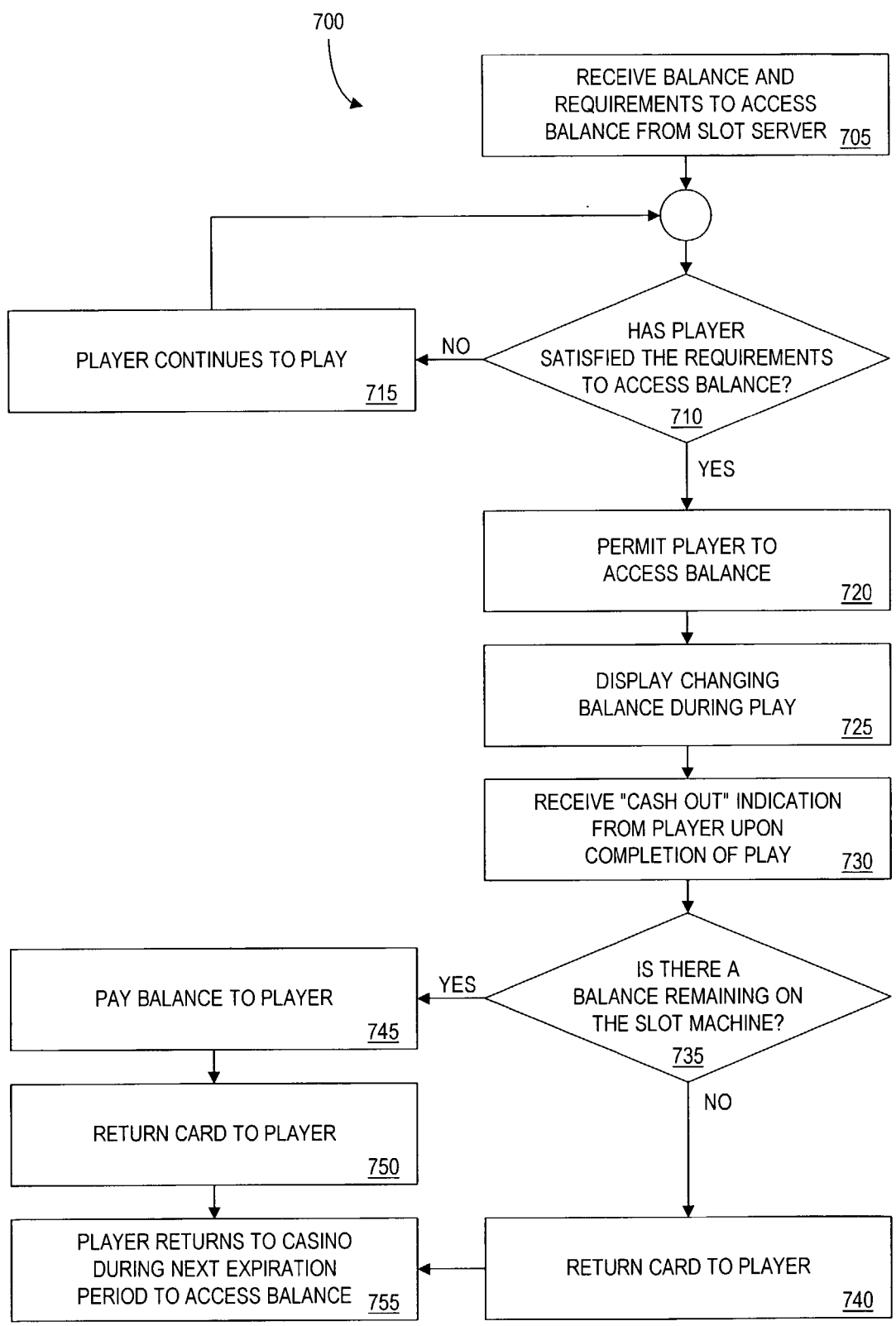
FIG. 7 is a flow chart describing an exemplary expiring slot card process as implemented by the slot machine of FIG. 3, in accordance with one embodiment of the present invention.

As previously indicated, the slot machine 300 may execute an expiring prepaid casino account process 700, shown in FIG. 7, to permit a player to utilize an expiring amount associated with an expiring prepaid casino account as a form of payment for slot machine play, provided the player has satisfied the defined requirement(s), if any, for accessing such expiring amounts. Thus, the expiring prepaid casino account process 700 may be initiated during step 705 upon receipt of the expiring amount balance and the requirement(s), if any, to access the balance which were transmitted by the slot server 200 during step 640 of the balance access process 600.

Thereafter, a test is performed during step 710 to determine if the player has satisfied the requirement(s), if any, to access the balance. If it is determined during step 710 that the player has not satisfied the requirement(s), if any, to access the balance, then the player is required to continue playing during step 715 until the requirement(s), if any, are satisfied. If, however, it is determined during step 710 that the player has satisfied the requirement(s), if any, to access the balance, then the player is permitted to access the expiring amount balance during step 720.

The changing balance may be displayed to the player during step 725 as play continues. Upon receipt of a "cash out" indication from the player following completion of play, during step 730, a test is performed during step 735 to determine if there is a remaining balance on the slot machine 300. If it is determined during step 735 that there is not a remaining balance on the slot machine 300, then the expiring prepaid casino card embodying the expiring prepaid casino account is returned to the player during step 740, and program control proceeds to step 755. If, however, it is determined during step 735 that there is a remaining balance on the slot machine 300, then the balance is paid to the player during step 745 and the expiring prepaid casino card embodying the expiring prepaid casino account is returned to the player during step 750. Finally, as indicated during step 755, the player is required to return to the casino 110 during the next expiration period if the player does not want to lose the next expiring amount balance.

Figure 8:
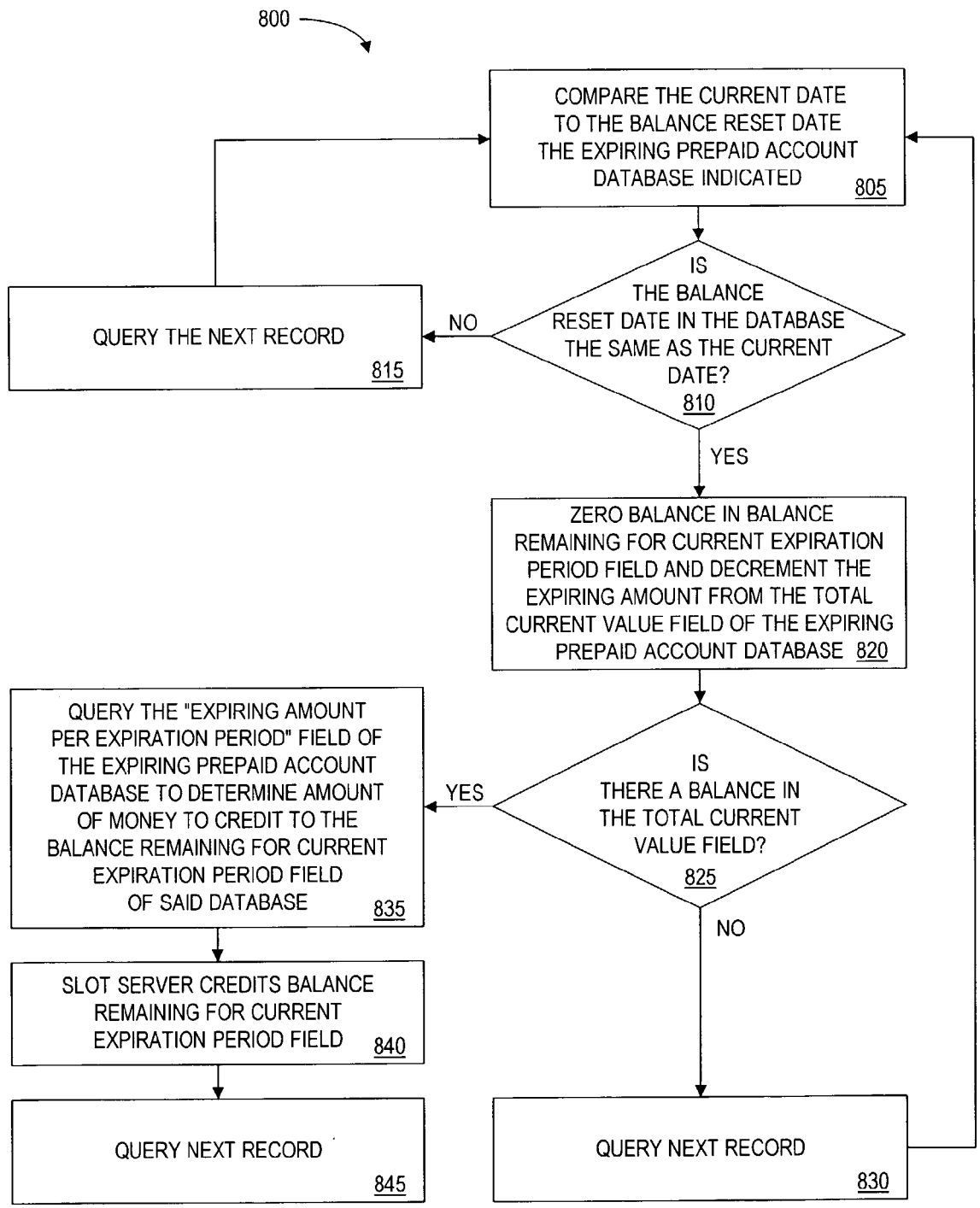
FIG. 8 is a flow chart describing an expiring balance update process as implemented by the slot server of FIG. 2, in accordance with one embodiment of the present invention.

As discussed above, the slot server 200 or another computing device operating in accordance with the present invention may periodically execute an expiring balance update process 800, shown in FIG. 8, to cause any remaining expiring amount associated with an expiring prepaid casino account to automatically expire if not utilized within the predefined expiration period. Thus, upon execution, the expiring balance update process 800 initially compares the current date to the balance reset date recorded in field 524 of the expiring prepaid account database 500. A test is then performed during step 810 to determine if the balance reset date in the expiring prepaid account database 500 is equal to the current date. If it is determined during step 810 that the balance reset date in the expiring prepaid account database 500 is not equal to the current date, then there is no balance to expire for the current record and the next record is queried during step 815 to be processed in the manner described above. If, however, it is determined during step 810 that the balance reset date in the expiring prepaid account database 500 is equal to the current date, then any balance in the balance remaining for current expiration period field 522 is set to zero during step 820 and the expiring amount is decremented from the total current value field 516 of the expiring prepaid account database 500.

Thereafter, a test is performed during step 825 to determine if there is a balance remaining in the total current balance field 516. If it is determined during step 810 that there is no balance remaining in the total current balance field 516, then the next record is queried during step 830 to be processed in the manner described above. If, however, it is determined during step 825 that there is a balance remaining in the total current balance field 516, then the expiring amount per expiration period field 518 is queried during step 835 to determine the amount of money to credit to the balance remaining for current expiration period field 522 of the expiring prepaid account database 500. Thereafter, the balance remaining for current expiration period field 522 of the expiring prepaid casino database 500 is credited with the appropriate amount during step 840. Thereafter, the next record is queried during step 845 to be processed in the manner described above.

As noted above, the present invention, including all embodiments disclosed herein, may also be applied in an online casino environment. For example, in one embodiment a player of an online casino may be provided with a player account number or other identifier that is linked to a plurality of prepaid amounts of money, time or game plays that each expire at a respective time. In such an embodiment each of the plurality of prepaid amounts may have a respective associated period of time during which the player may access the amount (e.g., or lose the amount if it is not utilized within the period of time), referred to as an expiration period herein. The player may thus develop a routine of visiting the online casino on a regular basis as specified by the casino via the periods of time and the number of prepaid amounts. For example, a player account number may be associated with three respective $10.00 amounts, where the first $10.00 amount may be accessed between July 1 and July 7; the second $10.00 amount may be accessed between July 8 and July 14; and the third $10.00 amount may be accessed between July 15 and July 21. Thus, in this example, the player may develop a routine of visiting the online casino on a regular basis by being encouraged, via the prepaid amounts, to visit the casino once a week for three weeks in a row in order to take advantage of the prepaid amounts (e.g., gamble with the prepaid amounts).

As also described above, in some embodiments, a plurality of amounts or quantities of prepaid game plays (rather than a plurality of monetary amounts) may be provided, each being associated with a predetermined expiration period. A game play may comprise, for example, a handle pull at a traditional slot machine or a final hand at a video poker machine. For example, a player may be provided with a slot card or account identifier that is associated with a plurality of quantities of free game plays, each quantity of free game plays being associated with a period of time during which the player may access the free game plays. If the player does not use each of the free game plays comprising a respective quantity of free game plays during the expiration period associated with the quantity of free game plays, the unused free game plays expire and are thus no longer available to the player. In one illustrative example of this embodiment a player may be provided with a slot card or account identifier that is associated with four quantities of prepaid game plays at a gaming device. In this example each of the four quantities comprises five game plays. Each quantity of game plays is associated with a respective period of time during which the quantity of prepaid game plays may be accessed by the player. For example, the first five game plays may be accessed between July 1 and July 7, the second quantity of five game plays may be accessed between July 22 and July 28, the third quantity of five game plays may be accessed between November 1 and November 7, and the fourth quantity of five game plays may be accessed between 2 pm and 8 pm on December 24.

In some embodiments, rather than being provided with a plurality of quantities of game plays that are free, the player may be provided with a plurality of quantities of game plays at a discounted wager amount. For example, for each expiration period, the player may play five game plays for a wager amount that is less than an otherwise normally required wager amount. For example, the player may be allowed access to bonuses or payout amounts that otherwise would only be available to players wagering the maximum number of coins per game play by only wagering half (50%) of the normal maximum number of coins per game play.

In other embodiments, a player may be provided with an expiring prepaid casino account associated with a plurality of amounts of time during which the player may play for free or for a discounted wager amount, wherein each of the amounts of time is associated with a respective period of time during which the amount of time may be utilized. For example, a player may be provided with a slot card or account identifier that is associated with two amounts of time: five minutes and ten minutes, each associated with a period of time. The five minute amount of time may be accessed between July 1 and July 7 and the ten minute amount of time may be accessed between July 8 and July 30. Thus in this example a player has five minutes during which he may gamble for free or for a reduced wager amount during the first week of July and 10 minutes during which he may gamble for free or for a reduced wager amount during the remainder of July. It should be noted that a reduced wager amount may comprise a percentage or dollar amount off a regular wager amount required to play a game.

In some embodiments, some or each of the amounts of money, time or game plays may be utilized only to play a specified gaming device, a specified type or category of gaming device, a gaming device in a specified area of the casino, or a specified game on a casino Web site. A different specified gaming device, type of gaming device, area of a casino or specified game may be associated for some or all of the respective quantities.

Restrictions in addition to the period of time during which the player may access the amounts of time, the monetary amounts, or the quantity of handle pulls or games may also be imposed. For example, in some embodiments once the player accesses an amount of time the player must use the amount of time consecutively until no time is left or the period during which the amount of time may be accessed ends. For example, in the above example, once the player begins to utilize the five minutes of free or discounted gambling time, the player must continue to play for the full five minutes or lose the remaining minutes. In other words, in some embodiments the player may not be allowed to access a portion of the amount of time available during a respective period of time, take a break, and then use the remaining portion of the amount of time at another time (e.g., an hour or day later). In other embodiments the player may use a given amount of time whenever or in whatever portions the player desires as long as it is within the period of time during which the amount of time is accessible (i.e., during the expiration period). Other restrictions may also be imposed upon a player's access to an available amount of time.

In some embodiments, rather than expiring, an amount of money, time or game plays associated with a particular expiration period may be converted to something of alternate value (i.e., an amount of alternate currency) if not used at the end of the expiration period. For example, an unused portion of an amount of money, time or game plays may be converted to one or more of (i) player reward points exchangeable for goods or services at the casino, (ii) frequent flier miles, (iii) gift certificates to merchants associated with the casino, (iv) discount coupons, (v) food and/or beverages, (vi) rooms at a hotel associated with the casino, (vii) room upgrades, if the player is registered as a guest at a hotel associated with the casino, (viii) phone minutes, (ix) access to services, (x) electronic files such as MP3™ files, and/or (xi) tickets to an entertainment event such as a movie, sporting event, or show at the casino.

Such amounts of alternate currency may be wholly or partially funded by a merchant other than the casino (e.g., an airline may provide and fund the frequent flier miles as a manner of acquiring a potential new customer). In some embodiments the alternate currency received in lieu of the amount of money, time, or game plays may be of higher actual or perceived value. For example, a $25.00 amount of money at the end of an expiration period may be converted to a $30.00 gift certificate to the new casino restaurant. In such an embodiment the player may perceive this as a benefit because he is receiving something of higher perceived value rather than simply losing the $25.00. The casino may also perceive this conversion as a benefit because it is introducing a potential new customer to its new restaurant and may view the amount as a normal customer acquisition cost it would incur in one manner or another.

In some embodiments there may be more than one level of conversion. For example, 15 minutes of gambling time may be converted to a $5 discount coupon to a show at the casino. The discount coupon may have its own expiration period associated with it. For example, if the 15 minutes of gambling was associated with an expiration period of July 1 to July 7, the discount coupon may have an expiration period of August 2 to August 9. In the present example, if the discount coupon is not utilized by the player by the end of the associated expiration period, it may itself be converted to something of alternate value such as two hundred player reward points. Any number of conversion levels may be utilized in accordance with the present invention.

It should be noted that the amount of money, time, or game plays originally associated with an expiration period need not convert to an alternate currency but may rather be modified to a different (e.g., smaller) amount of money, time or game plays. For example, at the end of an expiration period an associated 10 free game plays may be converted to 5 free game plays associated with a new expiration period. In another embodiment the amount of money, time or game plays originally associated with an expiration period may not change or expire at the end of the expiration period but conditions associated with the usage of the amount may be added or modified. For example, when gambling with an amount of money associated with a first expiration period the player may be allowed to cash out any winnings resulting from a game play funded with the amount of money. However, assuming in the current example that the player does not utilize the amount of money associated with the first expiration period and the amount of money is then associated with a second expiration period, the player may not be allowed to cash out the entirety or a portion of any winnings resulting from a game play funded with the amount of money during the second expiration period. For example, the winnings may be stored in association with the slot card or account in expiring amounts, each associated with a respective expiration period and may only be used for gambling. The player will thus have to gamble with the stored winnings during the associated expiration periods and hope that additional winnings result from game plays thus funded in order to eventually cash out the additional winnings. In other embodiments the stored winnings may also be usable for gambling or for purchasing goods and services from merchants associated with the casino.

In accordance with some embodiments, a player may be allowed to earn, win or otherwise obtain back an expired amount of money, time, or game plays. Similarly, a player may be allowed to earn, win or otherwise obtain an extension of an expiration period or a grace period (i.e., wherein a player does not utilize the amount of money, time or game plays during an expiration period yet is allowed to utilize it at another time). For example, one or more predetermined outcomes, if obtained by a player under specified conditions, may result in the player winning back an expired amount or a player winning an extension of an expiration period. In one example, a casino may hold a drawing every hour, wherein one winning player that is playing at the time of the drawing wins back all expired amounts for a predetermined time period (e.g., lifetime of the player, past year, past month). In another example, a player may agree to a forward commitment or perform a task in exchange for (i) earning back an expired amount, (ii) extending an expiration period; (iii) changing an expiration period from a first period of time to a second period of time; (iv) increasing an amount of money, time, or game plays associated with an expiration period; and/or (v) a grace period. The forward commitment or task may or may not be gambling related. For example, the player may commit to gamble for a predetermined amount of time or a predetermined amount of game plays (e.g., commencing at the time of the commitment or at another specified time). Alternatively, the player may answer survey questions, complete a purchase or agree to complete a purchase in the future, visit a merchant (brick-and-mortar or online) or agree to visit a merchant in the future.

In accordance with some embodiments, a player may be allowed to use all or a portion of an amount of money associated with an expiration period to purchase goods or services from a merchant associated with a casino in lieu of gambling with the amount of money. For example, a player may be able to purchase books from Amazon.com™ if the casino has an agreement with Amazon.com™ that allows the use of the amount of money for such a purchase. For example, Amazon.com ™ may provide part of the funding for such a purchase as a method of acquiring customers. For example, if a player has $5.00 on an expiring prepaid slot card the player may use the $5.00 for a purchase at Amazon.com™. However, the casino may only need to reimburse or pay Amazon.com™ $3.00 of that purchase from the funds stored on the card. In the present example, Amazon.com™ may provide the remaining $2.00 and the casino may be allowed to keep the remaining $2 stored on the card. The player may or may not be informed of such an arrangement (e.g., the player may perceive that the entire $5.00 stored in association with the card is being used for the purchase). In some embodiments, the player may only utilize amounts of money stored on a casino card to make such purchases if certain predetermined conditions are met. For example, the player may only be allowed to use an amount of money during the predetermined expiration period associated with the amount of money, or within a predetermined time before or after the expiration period ends (e.g., within three days of the end of the expiration period). In another example, the player may only use particularly identified or a specified number of amounts of money to make such purchases. For example, a player may only use one amount of money associated with a prepaid slot card to make such purchases.

In some embodiments the player may only be allowed to use an amount of money to make such purchases if contacted by a merchant that has an agreement with the casino. For example, Amazon.com™ may have an agreement with the casino wherein Amazon.com is informed of some or all amounts of money that are about to expire or have expired. Additionally, Amazon.com™ may be informed of data (e.g., identifying and/or demographic data) associated with the player that is associated with an amount of money. Thus, for example, Amazon.com™ may contact players that it determines to be potential new customers with an offer that allows the player to use the amount of money for a purchase at Amazon.com™. Such an offer may be beneficial for the casino because it may result in a favorable view of the casino by the player (e.g., the player may appreciate that the casino allowed the player to use the money to make a purchase rather than simply expiring it).

In accordance with some embodiments a player may request that an amount of money, time, or game plays associated with an expiring prepaid slot card be converted to an alternate currency. Such a request may be submitted to the casino before the subject amount of money, time or game plays expires. For example, a player may have an amount of money, time or game plays stored on his expiring prepaid slot card but know that he is leaving the casino and not returning before the end of the expiration period. Rather than simply letting the amount expire, the player may desire to convert the amount to an alternate currency. In such embodiments a casino may provide a terminal (e.g., a kiosk) into which the player may insert his expiring prepaid slot card and determine whether there are potential alternate currencies into which an amount of money, time or game plays may be converted. Similarly, a player may utilize such a terminal to determine whether there are tasks the player could perform or forward commitments the player could commit to in order to obtain, for example, (i) an extension or change of an expiration period; (ii) an increase in the amount of money, time, or game plays; and/or (iii) a grace period. The player may be presented, via the terminal, with a list of options defining what the player may exchange the amount for or what the player may obtain. Such options may be based on, for example, the casino's current inventory, management input, data related to the player, and/or revenue management principles. In an online casino embodiment, the player may click on a specified link or go to a specified Web page in order to view such options. Further, in some embodiments a player may be able to view such options via a gaming device (e.g., via a screen associated with a slot machine).

In some embodiments a player may elect to have an amount of money, time, or game plays automatically utilized for him if he is not going to be visiting the casino at the end of an expiration period. For example, if the subject amount is an amount of time that is fifteen minutes the player may agree that if he is not gambling and/or visiting the casino at a time that is fifteen minutes before the time the expiration period ends, the time should be utilized in his absence for his benefit. For example, the player may specify that the fifteen minutes of gambling is to be utilized at one or more particular gaming devices, type of gaming devices, or games. Any winnings resulting from such gambling for the player's benefit but in the player's absence may be credited to an account associated with the player. For example, the winnings may be stored in association with the player's account with the casino and obtained by the player the next time the player visits the casino. Alternatively the winnings may be credited to a credit card, debit card, checking, or other financial account associated with the player. Alternatively, the winnings may be stored in expiring amounts in association with the expiring prepaid slot card. The player may incur a penalty for not being present at a gaming device and/or the casino when the amount of money, time or game plays is gambled. For example, (i) the player may only obtain a portion of the winnings resulting from gambling funded by such an amount (e.g., 50%); (ii) only a portion of the amount of money, time or game plays may be utilized for such gambling; and/or (iii) any winnings resulting from such gambling may only be utilized for specified purchases or subsequent gambling.

Gambling for the benefit of a player but in the player's absence may be done by means of remotely controlling a gaming device with a computing device such as a casino server. For example, the casino server may lock up the gaming device for the amount of time the gambling is to occur and initiate consecutive game plays on the gaming device until the amount of time is depleted. Similarly, the casino server may lock up the gaming device and initiate game plays on the device until the subject amount of money to be gambled is depleted. Alternatively, an employee of the casino may physically use a gaming device and initiate game plays on the gaming device (e.g., using the identifier of the player's slot card or account identifier) until the subject amount of money, time, or game plays is depleted. Methods and systems of gambling for a player's benefit when the player is not present at a gaming device are disclosed in commonly-owned U.S. patent application Ser. No. 10/159,722, filed May 30, 2002 and entitled SYSTEM AND METHOD FOR AUTOMATED PLAY OF MULTIPLE GAMING DEVICES; which is a Continuation Application of U.S. patent application Ser. No. 09/879,299, filed Jun. 12, 2001 and entitled SYSTEM AND METHOD FOR AUTOMATED PLAY OF MULTIPLE GAMING DEVICES; which is a Continuation-In-Part Application of U.S. patent application Ser. No. 09/437,204, filed Nov. 9, 1999 and entitled Automated Play Gaming Device, which issued as U.S. Pat. No. 6,244,957 on Jun. 12, 2001; and which in turn is a Continuation Application of U.S. patent application Ser. No. 08/774,487, filed Dec. 30, 1996 and entitled Automated Play Gaming Device, which issued Jan. 11, 2000 as U.S. Pat. No. 6,012,983. All of the above are incorporated by reference herein for all purposes. In accordance with some embodiments, the player may select or agree to one or more rules that specify how, when, and under what circumstances the amount of money, time, or game plays are to be gambled on behalf of the player.

In accordance with some embodiments wherein an amount of money, time, or game plays is utilized for the benefit of a player in the player's absence, the amount may be utilized until a predetermined condition is met. For example, the amount may be utilized until the amount is depleted to zero. In an example where the amount comprises an amount of money, the amount may be utilized until the amount is either depleted to zero or until it is doubled. Such conditions may also be associated with amounts that the player himself uses (i.e., the conditions are not limited to embodiments where the amount is utilized for the benefit of the player in the player's absence).

In accordance with some embodiments, a reminder that an amount of money, time, and/or game plays is about to expire may be communicated to a player at a time before the end of the expiration period associated with the amount. For example, a message may be mailed to the player via electronic or postal mail. In an online casino embodiment an e-mail message reminding the player that an amount of money, time, or game plays is about to expire may be sent to the player hours before the end of the expiration period and the player may still have sufficient time to visit the casino and utilize the amount before it expires. In a brick-and-mortar casino embodiment an e-mail or other message may be transmitted to the player days or even weeks before the end of the expiration period in order to provide the player with sufficient time to make travel arrangements to visit the casino. A player may be alerted regarding an upcoming end of an expiration period via, for example, a personal computer (PC), a pocket PC, a personal digital assistant (PDA), a pager, a cellular telephone, a landline telephone, a display on a smart card (e.g., in embodiments wherein the slot card comprises a smart card with a display), and/or a gaming device. For example, a player may be alerted of the impending end of an expiration period while the player is playing a gaming device in a brick-and-mortar casino or gambling at an online casino.

In some embodiments a casino may determine that it is beneficial not to reference a time or passage of time to the player while the player is gambling. In such embodiments the casino may thus refrain from alerting the player about an impending end to an expiration period or may extend the expiration period to a time when the player is no longer gambling. In other embodiments a player may be alerted about an impending end of an expiration period while performing other activities. For example, a merchant associated with the casino (e.g., such as an online retailer) may communicate a message about the end of the expiration period to a player while the player is shopping with the merchant. In the embodiment described above wherein a player may utilize an amount of money about to expire to make purchases at a merchant, the merchant informing the player about the impending end of the expiration period may include an offer to use the amount of money about to expire for purchases with the merchant.

As described above, an amount of money stored in association with an expiring prepaid slot card may be funded by the casino, the player, another entity, or a combination thereof. In accordance with some embodiments, where the funds are partially or wholly provided by the player, a player may provide an amount of money to be associated with the player's expiring prepaid slot card in portions, each portion being associated with a respective expiration period. Such embodiments allow a player to budget his gambling money. For example, a player that is on vacation and planning on visiting the casino on several days during his vacation may place $100 on his expiring prepaid slot card and specify that the $100 be available to him in $25 portions on each of 4 days. Thus the player may utilize the card to allocate his gambling budget over four expiration periods, each expiration period comprising one of the four days. In such embodiments, the remainder of any portion not used by the player within an expiration period may or may not expire. Rather than expiring, for example, the remainder of a portion, if any, may be applied towards another bill associated with the player (e.g., the player's hotel bill if the player is a registered guest of the casino hotel).

In other embodiments any remainder of a portion not used by the player may expire but the player may initially receive a premium when placing his money on such an expiring prepaid slot card and thus risking having the premium expire. For example, a player may provide $100 to be associated with the card and, in exchange for the player's agreement that any unused portion of the money left at the end of an expiration period actually expire and no longer be available to the player, $125 may actually be associated with the card. In such an embodiment the casino or another entity may provide the additional $25. It should be understood that although a multiplier of 1.25 (or 125%) was used in the above example, any multiplier could be used to provide the player with a premium.

Premiums other than additional money may be provided to a player that agrees to risk expiration of money he provides for association with an expiring prepaid casino account. For example, access to bonuses, discounted wager amounts, increased probabilities of winning, free or discounted game plays, free gambling time, discount coupons, or alternate currencies such as player reward points or frequent flier miles may be provided to the player as a premium.

In accordance with some embodiments, a slot card given to a player may have only a single amount of money, time or number of game plays associated therewith at any given time. In such embodiments the player may need to interact with a casino employee and/or a device such as a kiosk in order to have another expiring prepaid amount associated with the card. For example, a plurality of expiring prepaid amounts of money, time or game plays may be associated with a player but only a single amount at any given time may be stored on a slot card or associated with a casino slot card. In such embodiments the player may, for example, present his card to a casino employee and/or a device such as a kiosk once the player uses up the amount currently stored on or associated with the card in order to have another amount stored on or associated with the card. Alternatively, the player may present his card once a new expiration period begins in order to have the amount associated with the expiration period be stored on or associated with the slot card.

In yet other embodiments a player may be provided with a plurality of slot card or account identifiers, wherein each slot card or account identifier is associated with a respective expiring prepaid amount of money, time or game plays. In such embodiments the player may be provided with the plurality of slot cards or account identifiers simultaneously or at different times (e.g., at the beginning of each expiration period or once the player uses up the amount).

It is to be understood that the embodiments and variations shown and described herein are merely illustrative of the principles of this invention and that various modifications may be implemented by those skilled in the art without departing from the scope and spirit of the invention. For example, although expiring prepaid casino account have been described herein as being associated with portions of an amount of money, time, or game plays it should be understood that a single expiring prepaid casino account may be associated with one or more expiring amounts of money, one or more expiring amounts of time, and one or more expiring amounts of game plays. Further, although the methods and systems of the present invention have been described as implemented in a casino, it should be understood that implementations in other environments are also envisioned. For example, an expiring prepaid account may be provided to players of lottery games (whether lottery games played in brick-and-mortar merchants or online). In such embodiments the amount of money, time, or game plays refers to an amount of money for use in playing lottery games, an amount of time that may be spent playing lottery games, and a number of lottery game plays.

We claim:

1. A method comprising:
   providing a player access to an amount, wherein the amount comprises a plurality of portions, and wherein each of the portions is associated with a respective expiration period;
   determining a current time;
   determining an end time of one of the expiration periods and the portion associated with the expiration period;
   adjusting the portion associated with the expiration period from a first value to a second value if the current time is within a predetermined time of the end time.

2. The method of claim 1, wherein the step of adjusting comprises:
   adjusting the portion associated with the expiration period from a first value to a second value if the current time is within a predetermined time before the end time.

3. The method of claim 1, wherein the step of adjusting comprises:
   adjusting the portion associated with the expiration period from a first value to a second value if the current time is the end time.

4. The method of claim 1, wherein the step of adjusting comprises:
   adjusting the portion associated with the expiration period from a first value to a second value if the current time is within a predetermined time after the end time.

5. The method of claim 1, wherein the first value is greater than the second value.

6. The method of claim 1, wherein the step of adjusting comprises:
   adjusting the portion associated with the expiration period from a first value that is usable by the player for a first activity to a second value that is usable by the player for a second activity
   if the current time is within a predetermined time of the end time.

7. The method of claim 6, wherein one of the first activity and the second activity comprises gambling.

8. An apparatus comprising:
   a storage device; and
   a processor in communication with the storage device,
   the storage device storing a program for controlling the processor; and
   the processor operative with the program to: perform the method of claim 1.

9. A medium encoded with a program for implementing a method, said program for directing a device to perform:
   the method of claim 1.

10. The method of claim 1, wherein providing a player access to an amount comprises at least one of:
    (i) providing a smart card to the player;
    (ii) providing a debit card to the player;
    (iii) providing a casino loyalty card to the player;
    (iv) providing access to an online casino account to the player;
    (v) providing access to an account stored on a casino server;
    (vi) providing a cardless electronic key to the player, the electronic key being associated with the account;
    (vii) associating a personal identification number to the player, the personal identification number operable to access the amount;
    (viii) providing a cashless gaming receipt to the player, the cashless gaming receipt storing an indication of the amount; and
    (ix) providing a prepaid casino card to the player.

11. The method of claim 1, wherein adjusting further comprises:
    determining a difference between the first value and the second value, thereby determining a third value; and
    making the third value available to the player for purposes other than gambling.

12. The method of claim 1, further comprising:
    determining whether the player has satisfied at least one condition and
    adjusting the portion only if the player has not satisfied the at least one condition.

13. The method of claim 12, wherein determining whether the player has satisfied the at least one condition comprises determining whether the player has agreed to at least one of a specified forward commitment and to performing a task.

14. The method of claim 12, wherein determining whether the player has satisfied the at least one condition comprises determining whether the player's gambling activity satisfies the at least one condition.

15. The method of claim 1, wherein the amount comprises a number of game plays and wherein each portion of the plurality of portions defines a subset of the number of game plays.

16. The method of claim 1, wherein the amount comprises an amount of money and wherein each portion of the plurality of portions defines a subset of the amount of money.

17. The method of claim 1, wherein the amount comprises an amount of time that the player can play a gaming device, and wherein each portion of the plurality of portions defines a subset of the amount of time.

18. A method comprising:
    associating an amount of a first currency with an account identifier,
       wherein the amount comprises a plurality of portions of the first currency, each portion being associated with a respective expiration period, and
       wherein each portion of the first currency is usable to fund gambling activity of a player;
    determining a current time;
    determining an end time of a first portion of the plurality of portions;
    determining that the current time is within a predetermined time of the end time; and
    converting the first portion to a second currency.

19. The method of claim 18, further comprising:
    associating a second expiration period with the converted first portion of the second currency.

20. The method of claim 18, wherein the first portion of the first currency is of a first value and the first portion of the second currency is of a second value.

21. The method of claim 20, wherein the first value is lesser than the second value.

22. The method of claim 20, wherein the first value and the second value comprise a measure of cost to an entity providing the first currency and the second currency.

23. The method of claim 18, wherein the converted first portion of the second currency is not usable to fund gambling activity of the player.

24. The method of claim 23, wherein the converted first portion of the second currency is usable, by the player, to purchase goods and services from a merchant.

25. An apparatus comprising:
    a storage device; and
    a processor in communication with the storage device, the storage device storing a program for controlling the processor; and the processor operative with the program to:

perform the method of claim 18.

26. A medium encoded with a program for implementing a method, said program for directing a device to perform:

the method of claim 18.

27. The method of claim 18, wherein the account identifier is associated with at least one of:

(i) a smart card provided to the player;
(ii) a debit card provided to the player;
(iii) a casino loyalty card provided to the player;
(iv) an online casino account;
(v) an account stored on a casino server;
(vi) a cardless electronic key provided to the player, the electronic key being associated with the account;
(vii) a personal identification number associated with the player, the personal identification number operable to access the amount;
(viii) a cashless gaming receipt provided to the player, the cashless gaming receipt storing an indication of the amount; and
(ix) a prepaid casino card provided to the player.

28. The method of claim 18, further comprising:

determining whether the player has satisfied at least one condition; and converting the first portion to a second currency only if the player has not satisfied the at least one condition.

29. The method of claim 28, wherein determining whether the player has satisfied the at least one condition comprises determining whether the player has agreed to at least one of a specified forward commitment and to performing a task.

30. The method of claim 28, wherein determining whether the player has satisfied the at least one condition comprises determining whether the player's gambling activity satisfies the at least one condition.

* * * * *